UNITED STATES PATENT OFFICE.

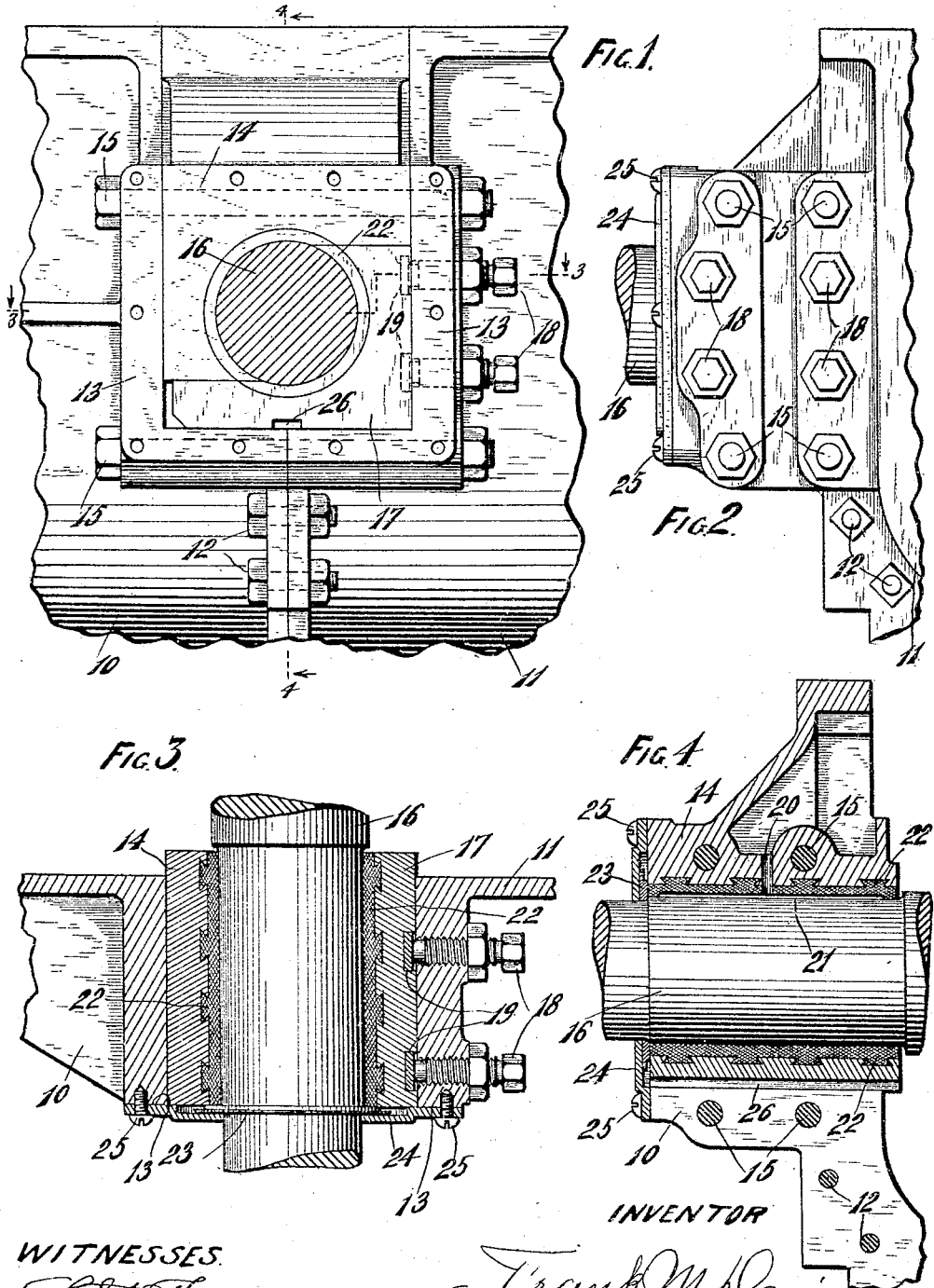

FRANK M. DAVIS, OF MILWAUKEE, WISCONSIN, ASSIGNOR TO AVERY COMPANY, OF PEORIA, ILLINOIS, A CORPORATION OF ILLINOIS.

BEARING.

1,287,254.

Specification of Letters Patent.   Patented Dec. 10, 1918.

Application filed October 18, 1916.   Serial No. 126,266.

*To all whom it may concern:*

Be it known that I, FRANK M. DAVIS, a citizen of the United States, and resident of Milwaukee, in the county of Milwaukee and State of Wisconsin, have invented new and useful Improvements in Bearings, of which the following is a description, reference being had to the accompanying drawings, which are a part of this specification.

This invention has for its object to provide a bearing for the crank shaft of a gas engine or the like, capable of adjustment to compensate for wear and to maintain an oil-tight working fit with the shaft.

Another object of the invention is to provide means for lubricating such a bearing without permitting a loss of oil therefrom.

With the above and other objects in view the invention consists in the bearing as herein claimed and all equivalents.

Referring to the accompanying drawings, in which like characters of reference indicate the same parts in the different views, Figure 1 is a front view of a bearing constructed in accordance with this invention, with the cap plate removed and the shaft sectioned;

Fig. 2 is a side view thereof;

Fig. 3 is a sectional view on the plane of line 3—3 of Fig. 1; and,

Fig. 4 is a sectional view on the plane of line 4—4 of Fig. 1.

In these drawings 10 and 11 indicate sections of the frame forming the crank case of a gas engine or the like which are held together by bolts 12, and which have angular projections 13 forming a U-shaped bearing housing between them. A stationary bearing member 14 fits between the side cheeks of the bearing housing and completes the casing between the upper parts of the frame sections 10 and 11. Bolts 15 pass transversely through the bearing housing, the upper pair passing through the side cheeks thereof and through the stationary bearing member 14, while the lower pair passes through the bottom portions of the projections forming the bearing housing.

The stationary bearing member 14 forms one-half of the bearing for the crank shaft or other shaft 16, but the faces thereof on opposite sides of the bearing are in different planes spaced apart a distance approximating the diameter of the shaft and parallel with the bottom wall of the bearing housing. A movable bearing member 17 having the same characteristics, and completing the bearing around the shaft, is slidably mounted in the housing and may be forced to slide toward the shaft by means of set screws 18 threaded in the side wall of the housing and engaging hardened blocks 19 let into the said member 17. Such movement of the bearing block 17 tightens the bearing around the shaft to make a close working fit therewith, and as the bearing members fit closely together in all adjustments the bearing is oil-tight and avoids the waste of lubricant from the crank case. The stationary bearing member 14 is in the form of a hollow casting opening to the interior of the crank case and forming a cup to catch and retain the oil whether it is distributed by splash feed or force feed, and an opening 20 leads from the bottom of this cavity to a groove 21 formed in the bushing 22 of Babbitt metal or other anti-friction metal, with which the bearing members are lined. Such oil as works through the bearing is thrown off by a ring 23 turning with the shaft at the end of the bearing, and a cap plate 24 secured to the parts of the bearing housing and the stationary bearing member by screws 25 surrounds the throw-off ring to catch the oil thrown off therefrom, while a drain groove 26 is formed in the bottom of the bearing member 17 to return the oil to the crank case.

The bearing of this invention makes a close working fit with the shaft which will not permit the escape of oil and is readily adjustable to take up wear. It is, therefore, clean and well fitting and is readily accessible for making repairs, the stationary bearing member 14 being capable of being withdrawn from the bearing housing to permit of the removal of the crank shaft.

What I claim as new and desire to secure by Letters Patent is:

1. A bearing, comprising an open bearing housing, a stationary bearing member confined between the walls of the bearing housing and closing the opening thereof, and an adjustable bearing member fitting within the bearing housing and slidable therein in contact with the stationary bearing member and forming therewith an opening for a shaft, the meeting faces of the bearing members being substantially tangent to the said opening.

2. A bearing, comprising a U-shaped bearing housing, a stationary member secured across the open end of the bearing housing and having a bearing groove with meeting faces on opposite sides thereof in parallel planes spaced apart approximately the width of the groove, a movable companion bearing member slidably fitting between the closed end of the bearing housing and the stationary member similarly shaped with its meeting faces bearing against the meeting faces of the stationary bearing member and its groove complementary to the groove of the stationary bearing member to tightly fit around the shaft, and means for adjusting the movable bearing member on its meeting faces to take up the wear of the bearing.

3. A bearing, comprising a bearing housing with a bottom wall and upstanding side walls and an open top, a stationary bearing member held between the side walls of the housing and spaced from the bottom wall thereof and closing the top, said stationary bearing member having a bearing groove with meeting faces leading from its edges to the sides of the stationary bearing member in parallel planes spaced apart approximately the width of the groove, a movable companion bearing member similarly shaped with its meeting faces bearing against the meeting faces of the stationary bearing member and its bottom surface resting on the bottom wall of the housing and its groove complementary to the groove of the stationary bearing member to tightly fit around the shaft, and set screws threaded in the side wall of the housing and engaging the movable bearing member to move it on the meeting faces of the bearing members to take up the wear of the bearing.

4. In a bearing, a casing formed in sections with angular projections forming a U-shaped bearing housing between them, a stationary bearing member secured between the projections to close the top of the bearing housing and having a bearing groove with meeting faces on opposite sides thereof in parallel planes spaced apart approximately the width of the groove, a movable companion bearing member similarly shaped with its meeting faces bearing against the meeting faces of the stationary bearing member and slidably seated on the bottom wall of the bearing housing and having its groove complementary to the groove of the stationary bearing member to tightly fit around the shaft, and means for adjusting the movable bearing member on its meeting faces to take up the wear of the bearing.

5. A bearing, comprising a casing formed of sections bolted together and having angular projections forming together a bearing housing having a bottom wall and upstanding side walls, a stationary bearing member fitting between the side walls of the bearing housing and having a bearing groove with meeting faces extending from its edges to the sides of the stationary member in parallel planes spaced apart approximately the width of the groove, bolts connecting the angular projections together through the bottom wall of the bearing housing and through the stationary bearing member and the side walls of the bearing housing, a movable companion bearing member also having a groove and bearing faces complementary to those of the stationary bearing member, said movable bearing member having its faces engaging the faces of the stationary bearing member and having its bottom surface bearing on the bottom wall of the housing, set screws threaded through a side wall of the bearing housing and engaging the movable bearing member to cause it to move and take up the wear of the bearing, the stationary bearing forming a pocket within the casing to receive lubricant, there being an opening leading from said pocket to the bearing groove of the stationary bearing member, a shaft fitting within the bearing, a throw-off ring turning with the shaft, and a cap plate secured to the bearing housing and inclosing the throw-off ring, there being a groove in the bottom of the movable bearing member to return lubricant from the cavity of the cap plate to the interior of the casing.

6. In a bearing, a casing having an opening, a trough-like bearing housing formed on the casing around the opening, a stationary bearing member secured across the top of the bearing housing and closing the opening of the casing, and an adjustable bearing member fitting within the bearing housing and slidable therein in contact with the stationary member and forming therewith an opening for the shaft, the meeting faces of the bearing members being substantially tangent to the said opening, said stationary bearing member forming a pocket within the casing to receive lubricant and having an opening leading to the shaft opening.

7. In a bearing, a casing having an opening, a trough-like bearing housing formed on the casing around the opening, a stationary bearing member secured across the top of the bearing housing and closing the opening in the casing, and an adjustable bearing member confined in the housing by the stationary bearing member and being complementary thereto to form a shaft opening between them.

8. In a bearing, a casing having an opening, a trough-like bearing housing formed on the casing around the opening, a stationary bearing member secured across the bearing housing and closing the opening, an adjustable bearing member confined in the bearing housing by means of the stationary bearing member and being complementary thereto to form a shaft opening between them, and a removable cover plate secured to the edges of the bearing housing and to the stationary bearing member.

In testimony whereof, I affix my signature, in presence of two witnesses.

FRANK M. DAVIS.

Witnesses:
ED. A. SOCHUREK,
WM. NELSON.